(12) United States Patent
Koizumi et al.

(10) Patent No.: US 6,578,778 B2
(45) Date of Patent: Jun. 17, 2003

(54) FUEL INJECTION VALVE

(75) Inventors: Masahiro Koizumi, Obu (JP); Yasunori Takaku, Obu (JP); Keiso Takeda, Mishima (JP); Yukio Koseki, Susono (JP); Tomojiro Sugimoto, Susono (JP)

(73) Assignees: Aisan Kogyo Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/758,319

(22) Filed: Jan. 12, 2001

(65) Prior Publication Data

US 2001/0010341 A1 Aug. 2, 2001

(30) Foreign Application Priority Data

Jan. 27, 2000 (JP) .......................................... 2000-019252

(51) Int. Cl.$^7$ ............................ F02M 61/00; B05B 1/00
(52) U.S. Cl. ............... 239/533.12; 239/463; 239/585.4; 239/596; 239/599; 239/601; 239/900
(58) Field of Search ................................ 239/463, 468, 239/469, 533.2, 533.12, 585.1, 585.4, 596, 597, 599, 601, 900

(56) References Cited

U.S. PATENT DOCUMENTS

| | | | | |
|---|---|---|---|---|
| 5,156,130 A | * | 10/1992 | Soma | 239/533.12 |
| 5,285,970 A | * | 2/1994 | Maier et al. | 239/596 |
| 5,346,137 A | * | 9/1994 | Okamoto et al. | 239/533.12 |
| 5,353,992 A | * | 10/1994 | Regueiro | 239/599 |
| 5,464,154 A | * | 11/1995 | Nielsen | 239/597 |
| 5,622,489 A | * | 4/1997 | Monro | 239/601 |
| 6,019,296 A | * | 2/2000 | Yamamoto et al. | 239/533.2 |
| 6,092,743 A | * | 7/2000 | Shibata et al. | 239/585.1 |
| 6,105,883 A | * | 8/2000 | Takeda et al. | 239/533.12 |
| 6,155,504 A | * | 12/2000 | Sugimoto et al. | 239/596 |

FOREIGN PATENT DOCUMENTS

| | | |
|---|---|---|
| JP | 8-158989 | 6/1996 |
| JP | 11-117831 | 4/1999 |
| JP | 11-159421 | 6/1999 |
| WO | WO 96/36808 | 11/1996 |

* cited by examiner

Primary Examiner—Steven J. Ganey
(74) Attorney, Agent, or Firm—Finnegan, Henderson, Farabow, Garrett & Dunner, L.L.P.

(57) ABSTRACT

The fuel injection valve according to the present invention is a fuel injection valve adapted to inject a swirl flow of a high-pressure fuel from an injection port thereof. The injection port includes a fuel inlet portion and a fuel outlet portion. The fuel inlet portion has a cylindrical bore. In the fuel outlet portion, a circumference of an inlet thereof is joined to that of an outlet of the cylindrical bore, and the fuel outlet portion has a cross-sectionally elliptic chamfered part diverging from the inlet thereof to the outlet thereof. A depth of the chamfered part is set ¼ to 2 times as large as a diameter of the fuel inlet portion.

3 Claims, 5 Drawing Sheets

θa

θb

FUEL INJECTION VALVE

BACKGROUND OF THE INVENTION (1) Field of the Invention

This invention relates to a fuel injection valve-adapted to inject a swirl flow of a high-pressure fuel from an injection port thereof.

(2) Description of the Related Art

The related art fuel injection valves include a fuel injection valve adapted to inject a high-pressure fuel directly into a combustion chamber of an internal combustion engine. As an example of this type of fuel injection valve, a fuel injection valve adapted to generate a swirl flow (a whirling flow or a vortex flow) in a high-pressure fuel, and inject the resultant fuel from an injection port so as to atomize fuel spray and increase a spray angle is known (refer to, for example, Japanese Patent Laid-Open No. 158989/1996).

The inventors of the present invention attempted to provide at an outlet portion of a fuel injection port of the same fuel injection valve as is taken as an example above with an inclined surface extending divergently in the fuel injection direction, for the purpose of further increasing a spray angle. However, according to this fuel injection valve made by way of trial, it was ascertained that the fuel spray interfered with an inlet valve, an exhaust valve and a spark plug due to restrictions placed on the mounting position of the fuel injection valve.

The inventors of the present invention then discussed the cause of this inconvenience to discover that the injection port having a cylindrical shape caused a cross-section of an atomized fuel injected from the injection port, i.e., a cross section, which is perpendicular to the fuel injection direction, of the fuel spray injected from the injection port to become right circular, and that this caused the inconvenience to occur. It was also discovered that, when the injection port was formed to a flattened shape over the whole length thereof so as to eliminate this inconvenience, the turning force of a swirl flow in the injection port was attenuated.

SUMMARY OF THE INVENTION

The present invention has been made in view of the above-mentioned circumstances, and provides on the basis of the above knowledge a fuel injection valve capable of eliminating the above-described inconvenience by a simple structure.

The fuel injection valve according to the present invention is a fuel injection valve adapted to inject a swirl flow of a high-pressure fuel from an injection port thereof, characterized in that the injection port includes a fuel inlet portion and a fuel outlet portion, the fuel inlet portion having a cylindrical bore, the fuel outlet portion having a cross-sectionally elliptic chamfered part, the chamfered part being joined at a circumference of an inlet thereof to a circumference of an outlet of the cylindrical bore, the chamfered part being formed so as to diverge from the inlet thereof to the outlet thereof.

In the fuel injection valve according to the present invention, a swirl flow of a high-pressure fuel is injected in the form of fuel spray into a combustion chamber of an internal combustion engine as the swirl flow is turned continuously along a circumferential surface of the cylindrical bore of the injection port and a circumferential surface of the chamfered part. During this time, a cross section, which is perpendicular to the injection direction, of the fuel spray injected from the injection port becomes elliptic due to the chamfered part of the fuel outlet portion.

Therefore, when an inlet valve, an exhaust valve and a spark plug are provided on the side of a shorter diameter portion of the elliptic cross section of the fuel spray, it becomes possible to prevent the fuel spray from interfering with the inlet valve, the exhaust valve and the spark plug while increasing a spray angle, and the attenuation of the turning force of the swirl flow is held down.

BRIEF DESCRIPTION OF THE DRAWINGS

FIG. 1A is a magnified view of the nozzle tip 10 and adjacent components, shown in FIG. 1.

DESCRIPTION OF THE PREFERRED EMBODIMENTS

Figure 1:
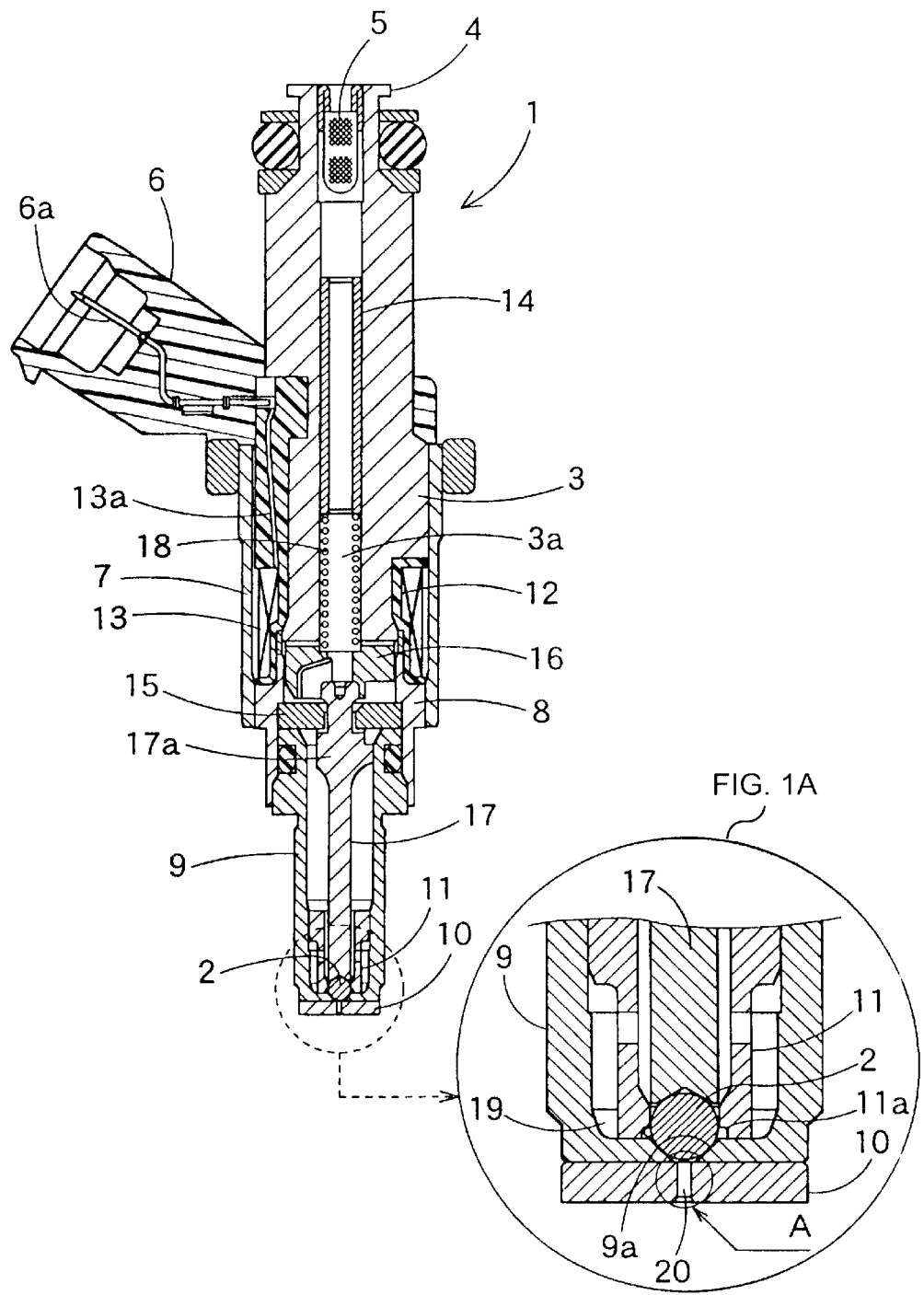
FIG. 1 is a sectional view of a first mode of embodiment of the fuel injection valve according to the present invention.

Referring to FIG. 1, a fuel injection valve 1 is an inside-cylinder injection type (direct injection type) fuel injection valve used for gasoline engines. The fuel-injection valve 1 uses a ball 2 as a valve disc.

This fuel injection valve 1 includes a core 3, a fuel connector 4, a strainer 5, an electric connector 6, a housing 7, a body 8, a valve seat 9, a nozzle tip 10, a swirler 11, a bobbin 12, a solenoid coil 13, a spring pin 14, a spacer 15, an armature 16, a rod 17, a ball 2 and a spring 18.

The core 3 is formed of a magnetic material. The core 3 has a cylindrical hollow portion 3a constituting a fuel passage.

The fuel connector 4 is formed of a rear end portion (upper end portion in FIG. 1) of the core 3. The fuel connector 4 is joined to a delivery pipe (not shown).

The strainer 5 is fixed in a hollow portion of the fuel connector 4.

The electric connector 6 is fixed to an outer circumferential surface of a longitudinally (vertically in FIG. 1) intermediate portion of the core 3. The electric connector 6 has a terminal pin 6a projecting to the outside.

The housing 7 is formed of a tubular magnetic material. The housing 7 is fixed to an outer circumferential surface of a longitudinally intermediate portion of the core 3.

The body 8 is formed of a tubular magnetic material. The body 8 is fixed to a front end portion of the housing 7.

The valve seat 9 is formed to a bottomed cylindrical structure. The valve seat 9 is fixed to a front end portion of the body 8. A bottom portion of the valve seat 9 has a seat surface (fuel port) 9a. The seat surface (fuel port) 9a converges in the forward direction.

Figure 2:
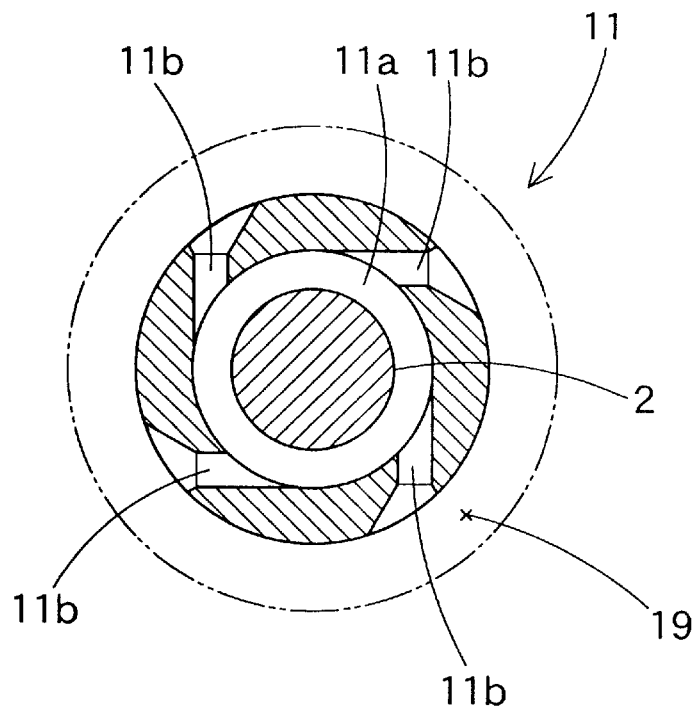
FIG. 2 is a sectional view of a swirler shown in FIG. 1.

The swirler 11 is fixed to a bottom of the valve seat 9. A front end portion of the swirler 11 has an annular swirl chamber 11a, and plural swirl ports 11b as shown in FIG. 2. The plural swirl ports 11b extend from a fuel introduction chamber 19. The plural swirl ports 11b are joined to the swirl chamber 11a in the tangential direction thereof.

The nozzle tip 10 has an injection port 20. The injection port 20 is formed so as to be joined to a circumference of a front end of the seat surface 9a of the valve seat 9. The nozzle tip 10 is welded to a front surface of the valve seat 9.

Figure 3:
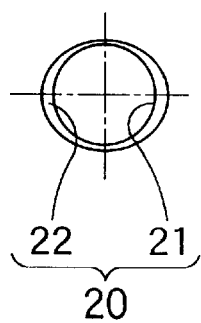
FIG. 3 is an enlarged bottom view of an A-portion shown in FIG. 1.
Figure 4:
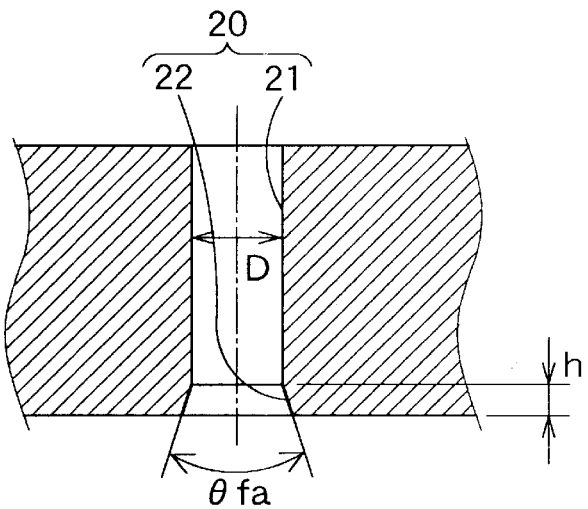
FIG. 4 is an enlarged front view of this A-portion.
Figure 5:
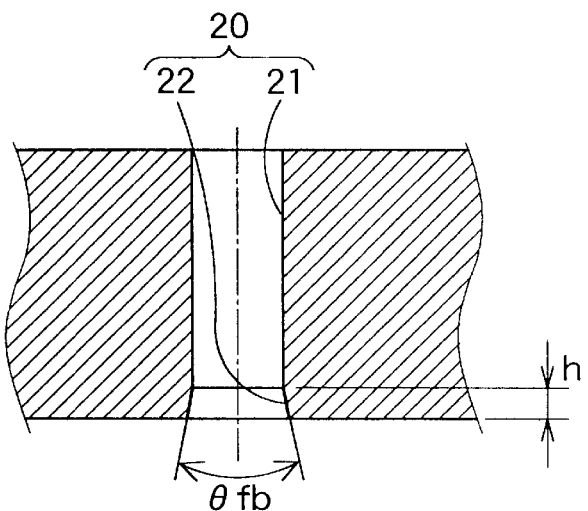
FIG. 5 is an enlarged side view of the same A-portion.

The injection port 20 is formed as shown in FIGS. 3–5. As shown in FIGS. 3–5, the injection port 20 includes a fuel inlet portion 21 and a fuel outlet portion 22. A length in the injection direction of the fuel inlet portion 21 is relatively large as compared with that of the fuel outlet portion 22. The fuel inlet portion 21 has a cylindrical bore. A circumference of an inlet of this fuel inlet portion 21 is joined to that of an outlet of the seat surface 9a. A length in the injection direction of the fuel outlet portion 22 is relatively small as compared with that of the fuel inlet portion 21. The fuel outlet portion 22 has a cross-sectionally elliptic chamfered part. A circumference of an inlet of the fuel outlet portion 22 is joined to that of an outlet of the fuel inlet portion 21. The fuel outlet portion 22 diverges from the inlet to the outlet thereof, and has a cross-sectionally elliptic shape. The methods of forming the chamfered part 22 includes a cutting method using an elliptic punch or an end mill, laser beam machining, electric discharge machining, wire cut machining and MIM molding.

The bobbin 12 is formed out of a synthetic resin. The bobbin 12 is provided on an outer circumferential surface of a front end portion of the core 3.

The solenoid coil 13 is wound around the bobbin 12. The solenoid coil 13 is covered with the housing 7. The solenoid coil 13 is electrically connected to a terminal pin 6a of the electric connector 6 through a lead wire 13a.

The spring pin 14 is press-fitted in an intermediate portion of the hollow portion 3a of the core 3.

The spacer 15 is formed to a C-shaped flat plate member. The spacer 15 is fixed between a rear end surface of the valve seat 9 and a surface of a stepped portion of the body 8. The spacer 15 works so as to regulate a stroke amount of the ball 2.

The armature 16 is housed longitudinally movably in a space formed by a rear surface of the spacer 15, a front surface of the core 3 and an inner circumferential surface of the body 8. The armature 16 has a fuel passage.

The rod 17 is fixed to a front end portion of the armature 16. A rear surface of an expanded portion 17a of the rod 17 is engaged with a front surface of the spacer 15 when an electric current is applied to the solenoid coil 13, and functions as a stopper for restricting a rearward movement of the rod 17.

The ball 2 is fixed to a front end portion of the rod 17.

The spring 18 is provided between a front end surface of the spring pin 14 and a rear end surface of the armature 16. The spring 18 normally imparts an urging force to the armature 16 in the direction of advance (valve closing direction) thereof.

The operation of the fuel injection valve 1 formed as mentioned above will now be described.

The fuel injection valve 1 is opened and closed in accordance with the presence and absence of an electric current in the solenoid coil 13.

When an electric current is not applied to the solenoid coil 13, the armature 16 receives from the spring 18 an urging force in the valve closing direction, and is in an advanced position with the ball 2 pressed against the seat surface 9a, whereby the fuel injection valve 1 is closed.

When an electric current flows in the solenoid coil 13, the armature 16 receives an urging force in the valve opening direction due to a magnetic force generated by the solenoid coil 13, and this urging force working in the valve opening direction is larger than that working in the valve closing direction of the spring 18. Consequently, the armature 16 is in a receding position, and the ball 2 leaves the seat surface 9a, so that the fuel injection valve 1 is opened.

When the valve is opened, the high-pressure fuel in the fuel introduction chamber 19 flows into the swirl chamber 11a through the swirl port 11b to turn into a swirl flow, which is injected in the form of fuel spray into a combustion chamber (not shown) of a gasoline engine as the fuel turns along the seat surface 9a, a circumferential surface of the cylindrical bore 21 and a circumferential surface of the chamfered part 22.

Figure 6:
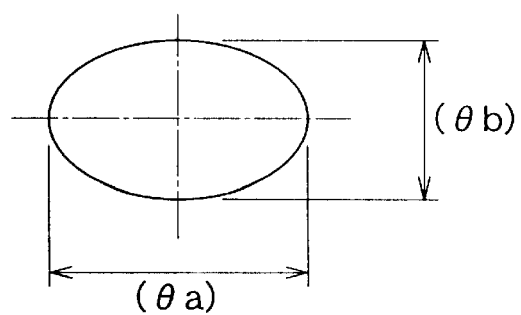
FIG. 6 is a drawing showing a cross-sectional shape of fuel spray.
Figure 7:
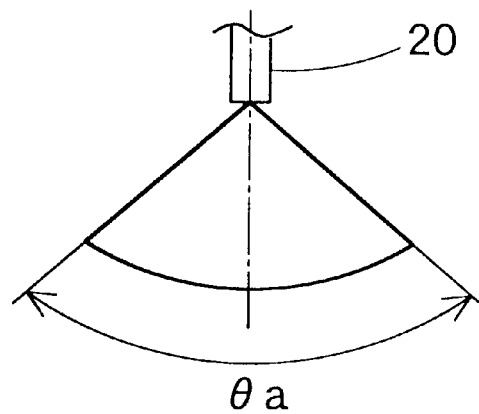
FIG. 7 is a front view showing a fuel spray angle.
Figure 8:
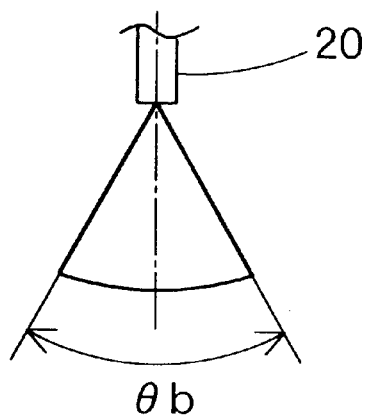
FIG. 8 is a side view showing the same fuel spray angle.
Figure 9:
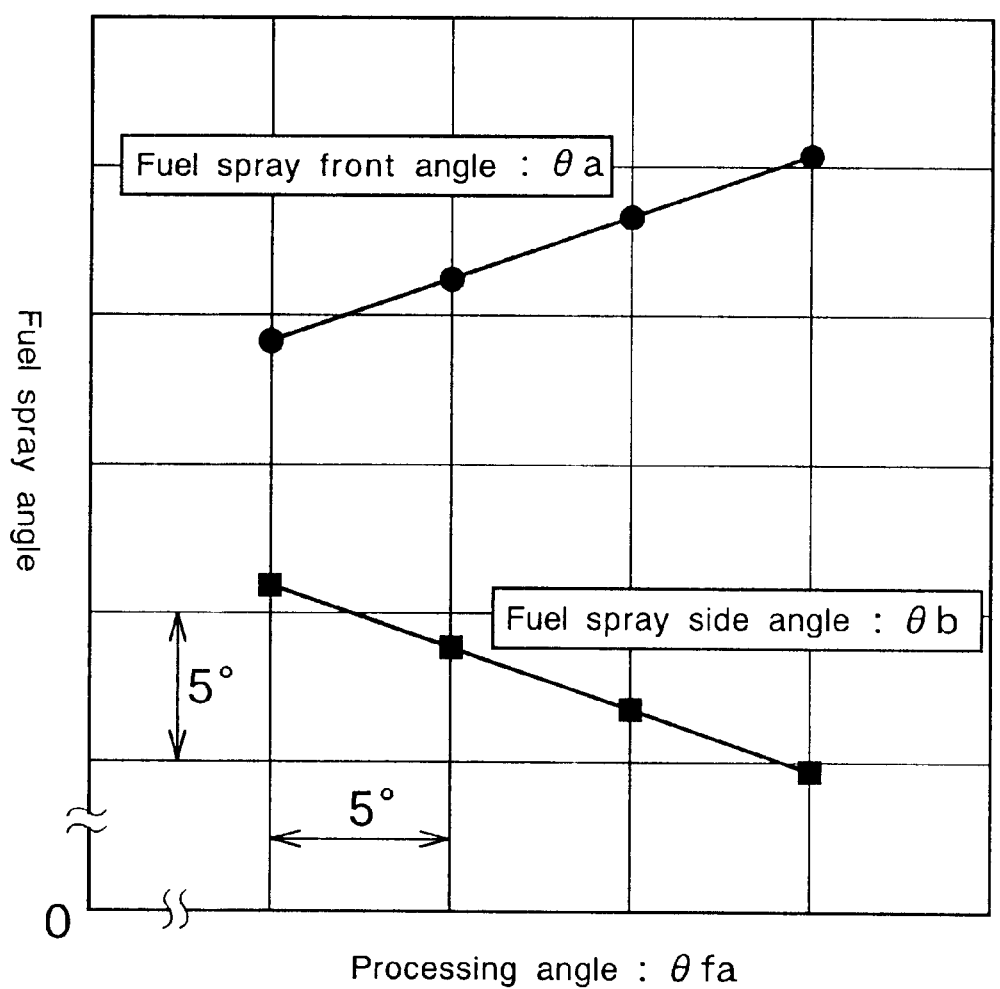
FIG. 9 is a graph showing the relation between a processing angle of a chamfered part and a fuel spray angle.

In this embodiment, the fuel outlet portion 22 of the injection port 20 is formed by a cross-sectionally elliptic chamfered portion 22 as mentioned above. Therefore, a cross section, which is perpendicular to the fuel injection direction, of the fuel spray injected from the injection port 20 becomes elliptic as shown in FIG. 6. A fuel spray angle (front angle) θa of a longer diameter-including portion of the elliptic cross section of fuel spray is large as shown in FIG. 7, while a fuel spray angle (side angle) θb of a shorter diameter-including portion thereof is small as shown in FIG. 8. Let θ equal a fuel spray angle obtained when, for example, the chamfered part 22 is formed to a right circular cross section, the front angle θa and side angle θb are set so as to satisfy a relational expression 2θ=θa+θb. The front angle θa and side angle θb can be obtained arbitrarily by the adaptation of a processing angle θfa of a longer diameter side of the chamfered part 22 and that θfb of a shorter diameter side thereof. For example, FIG. 9 shows the relation, which is determined when a processing angle θfb of a shorter diameter side is set to a predetermined level of 0°–2°; a processing depth h to 0.76 mm; and an injection rate Q to 800 cm$^3$/min (injection port diameter D to φ0.67) between a processing angle θfa of the longer diameter side and the fuel spray angles θa, θb. It is understood from this graph that the front angle θa and side angle θb vary in accordance with the processing angle θfa (14°–28°).

Therefore, the interference of fuel spray with a inlet valve, an exhaust valve and a spark plug can be prevented as the fuel spray angle is increased, by disposing the inlet valve (not shown), the exhaust valve (not shown) and the spark plug (not shown) on the shorter diameter side (side surface angle side) of an elliptically shaped cross section of fuel spray. The depth h of the chamfered portion 22 is set to D/4–2D with respect to a diameter D of the fuel inlet portion 21. This enables the elliptic cross-sectional shape of fuel spray to be secured at all times. When a value of h is smaller than D/4, the cross-sectional shape of the fuel spray comes closer to a right circle, and, when the value of h exceeds 2D, the cross-sectional shape of the fuel spray is flattened (the characteristics shown in FIG. 9 cannot be obtained). The swirl flow in the fuel outlet portion 22 passes through the comparatively shallow elliptic chamfered part, whereby the attenuation of a turning force applied to the swirl flow is held down.

Although the chamfered part 22 is provided in the injection port 20 in this mode of embodiment, a chamfered portion-carrying structure may also be formed by removing the nozzle tip 10, providing an injection port similar to the above-mentioned injection port 20 in the valve seat 9, and providing a chamfered part similar to the above-mentioned chamfered part 22 in the resultant fuel injection port. In this case, the operation and effect identical with those mentioned above can also be obtained.

What is claimed is:

1. A fuel injection valve comprising:

a valve seat including a substantially planar nozzle tip portion;

a fuel injection port including a generally cylindrical fuel inlet portion, having a diameter D; and a fuel outlet portion having a generally elliptical chamfered portion with a depth h, the fuel injection portion defined in said substantially planar nozzle tip portion, a front fuel spray angle $\theta a$, and a side fuel spray angle $\theta b$, an inlet of the generally elliptical chamfered portion connecting to an outlet of the inlet portion;

wherein $h=D/4-2D$;

and wherein a fuel spray angle $\theta$ of said fuel outlet portion is defined such that $2\theta=\theta a+\theta b$.

2. A fuel injection valve according to claim 1, further comprising a swirler communicating with an inlet of said inlet portion of said fuel injection port.

3. A fuel injection valve according to claim 2, wherein said swirler comprises an annular swirl chamber and at least one tangential swirl port connected to said swirl chamber.

* * * * *